US011673503B2

(12) United States Patent
Wieth

(10) Patent No.: US 11,673,503 B2
(45) Date of Patent: Jun. 13, 2023

(54) MOTORHOME WITH A SEAL ARRANGED BETWEEN A SUPERSTRUCTURE AND A DISPLACEABLE ROOM EXTENSION MODULE

(71) Applicant: PROTEC GMBH & CO. KG, Wessling (DE)

(72) Inventor: Franz Wieth, Feldafing (DE)

(73) Assignee: PROTEO GMBH & CO. KG, Wessling (DE)

( * ) Notice: Subject to any disclaimer, the term of this patent is extended or adjusted under 35 U.S.C. 154(b) by 280 days.

(21) Appl. No.: 17/250,200

(22) PCT Filed: Jun. 24, 2019

(86) PCT No.: PCT/EP2019/066677
§ 371 (c)(1),
(2) Date: Dec. 14, 2020

(87) PCT Pub. No.: WO2020/002241
PCT Pub. Date: Jan. 2, 2020

(65) Prior Publication Data
US 2021/0253017 A1 Aug. 19, 2021

(30) Foreign Application Priority Data
Jun. 25, 2018 (DE) .................... 10 2018 210 330.5

(51) Int. Cl.
*B60P 3/34* (2006.01)
(52) U.S. Cl.
CPC ..................................... *B60P 3/34* (2013.01)

(58) Field of Classification Search
CPC ................. B60P 3/34; B60P 3/36; B60P 3/39
See application file for complete search history.

(56) References Cited

U.S. PATENT DOCUMENTS 2,965,412 A * 12/1960 Henderson ............... B60P 3/34
296/171
3,572,809 A 3/1971 Buland
(Continued)

FOREIGN PATENT DOCUMENTS

JP 2014-61813 A 4/2014

OTHER PUBLICATIONS

Communication Pursuant to Article 94(3) EPC issued in European Patent Application No. 19 733 735.5-1015 dated Jan. 12, 2022.
(Continued)

*Primary Examiner* — Gregory A Blankenship
(74) *Attorney, Agent, or Firm* — IceMiller LLP

(57) ABSTRACT

A motorhome with a superstructure, the superstructure having at least one room extension module which is displaceably attached to it, and a seal which is arranged between the superstructure and the room extension module, at least one force transmission means being arranged in the area of the seal on the superstructure and/or on the room extension module, which means is configured in such a way that it narrowly limits a vertical relative movement between the superstructure and the room extension module by transmitting forces acting in the vertical direction between the room extension module and the superstructure. The force transmission means can be designed as a pin or also as a rail with a carriage guided displaceably therein.

19 Claims, 3 Drawing Sheets

(56) References Cited

U.S. PATENT DOCUMENTS

Figure 1:
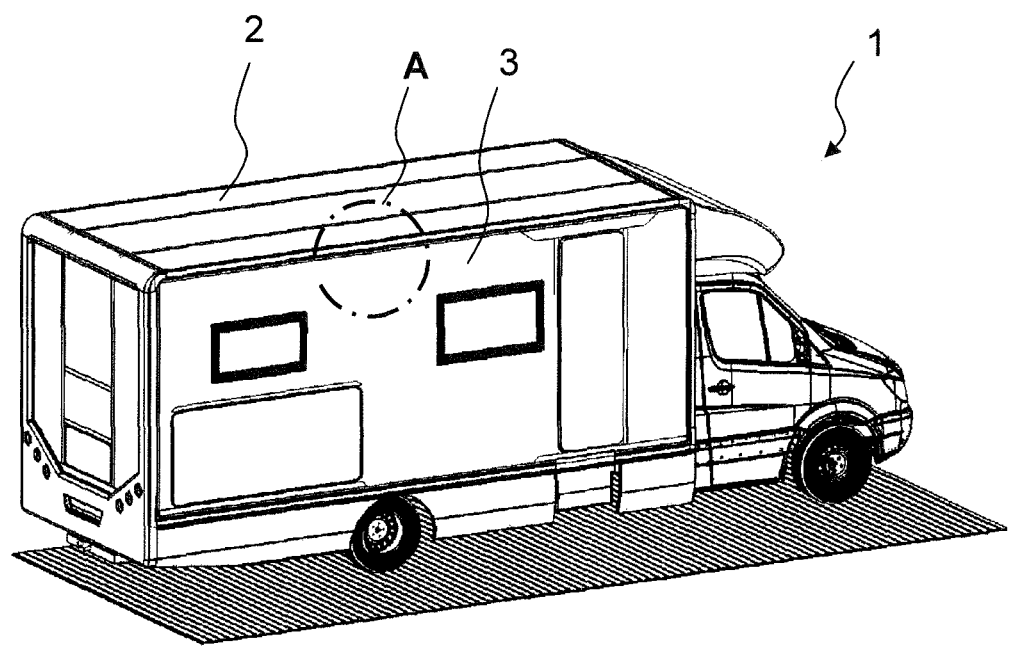

| | | | | |
|---|---|---|---|---|
| 4,253,283 | A * | 3/1981 | May | E04B 1/34336 52/67 |
| 5,248,180 | A * | 9/1993 | Hussaini | B62D 33/08 296/165 |
| 5,491,933 | A * | 2/1996 | Miller | B60P 3/34 D12/104 |
| 5,577,351 | A * | 11/1996 | Dewald, Jr. | E04B 1/3431 296/171 |
| 5,791,715 | A * | 8/1998 | Nebel | B60P 3/34 296/171 |
| 5,902,001 | A * | 5/1999 | Schneider | B60P 3/34 296/171 |
| 6,108,983 | A * | 8/2000 | Dewald, Jr. | B60P 3/34 296/26.14 |
| 6,227,607 | B1 * | 5/2001 | Dewald, Jr. | B60P 3/34 296/165 |
| 6,293,611 | B1 * | 9/2001 | Schneider | B60P 3/34 296/26.14 |
| 6,702,353 | B1 | 3/2004 | Blodgett | |
| 7,011,351 | B1 * | 3/2006 | Crean | B60P 3/34 296/26.12 |
| 7,066,528 | B1 * | 6/2006 | Crean | B60P 3/34 296/165 |
| 7,229,123 | B2 * | 6/2007 | Kunz | B60P 3/34 296/165 |
| 7,316,439 | B1 * | 1/2008 | Crean | B60P 3/34 296/171 |
| 7,328,927 | B1 * | 2/2008 | Crean | B60P 3/34 296/165 |
| 7,380,854 | B1 | 6/2008 | Hanser et al. | |
| 7,731,256 | B1 | 6/2010 | Wivinis | |
| 10,967,777 | B2 * | 4/2021 | Howie | B60P 3/34 |
| 11,318,827 | B1 * | 5/2022 | Maloney | B60J 10/00 |
| 2002/0074816 | A1 * | 6/2002 | McManus | B60P 3/34 296/26.13 |
| 2002/0093214 | A1 * | 7/2002 | McManus | B60P 3/34 296/26.13 |
| 2004/0256874 | A1 | 12/2004 | Rex | |
| 2008/0315607 | A1 * | 12/2008 | Herson | B60P 3/34 296/26.13 |
| 2013/0106131 | A1 * | 5/2013 | Yoder | B60P 3/34 296/26.13 |
| 2015/0308546 | A1 * | 10/2015 | Dame | B60P 3/34 74/103 |
| 2018/0370414 | A1 * | 12/2018 | Wieth | B60P 3/34 |
| 2021/0253017 | A1 * | 8/2021 | Wieth | B60P 3/34 |

OTHER PUBLICATIONS

German Examination Report issued in German Patent Application No. 10 2018 210 330.5 dated Oct. 1, 2021, with machine translation.
Office Action for Chinese Application No. 201980042885.2, dated Oct. 8, 2022; and translataion.

* cited by examiner

MOTORHOME WITH A SEAL ARRANGED BETWEEN A SUPERSTRUCTURE AND A DISPLACEABLE ROOM EXTENSION MODULE

CROSS-REFERENCE TO RELATED APPLICATIONS

This application is a National Stage of International Patent Application No. PCT/EP2019/066677, filed on Jun. 24, 2019, which claims priority to German Patent Application No. DE 10 2018 210 330.5, filed on Jun. 25, 2018, the disclosures of which are incorporated by reference in their entirety.

The present invention concerns a motorhome with a superstructure, wherein the superstructure has at least one room extension module displaceably attached to it and a seal arranged between the superstructure and the room extension module.

Such motorhomes are generally known. In the sense of this invention, a motorhome is to be understood as a motorized vehicle such as a recreational vehicle but also as a non-motorized vehicle such as a caravan. It also does not matter for which purposes the motorhome is used. It is only important that it has a superstructure which has an interior suitable for the permanent stay of people. It also makes no difference whether the motorhome is used for long journeys or very short journeys—for example within a city.

What all motorhomes have in common is that the usable interior of the superstructure of the motorhome is significantly smaller and more limited compared to non-mobile recreational, living and/or work space. It is therefore well known that lateral room extension modules with a drawer-like functional principle are arranged on the superstructure to enlarge the interior space. These room extension modules, also referred to here as slideouts, offer the possibility of extending the room of the motorhome superstructure by sliding out a part of the room which is usually open towards the inside of the vehicle. Most slideouts, therefore, have three walls, a floor and a roof.

As with all moving parts, it is of central importance for the interaction of the superstructure and the room extension module that the interface or joint area between them is sealed as weatherproof as possible. It is therefore known to provide a seal between the superstructure and the room extension module. This seal is preferably configured as an activatable seal.

An activatable seal is a seal whose sealing effect can be actively influenced, e.g. by a change in volume. In concrete terms, this can be a tube seal which is pressurized with compressed air or other fluid for activation. Then the seal expands and can fit itself in a tight and sealed manner between the two parts to be sealed. However, when the room extension module is to be moved into the superstructure, the seal is deactivated. This can happen by releasing the compressed air. In the deactivated mode, the volume of the seal shrinks and the room extension module can be easily moved without damaging the seal.

Especially with larger room extension modules, it turned out that every now and again there is a relatively unsatisfactory sealing effect, even when activatable seals are used. In other words, even with seals that are relatively flexibly adaptable and well adjustable in their sealing effect, the sealing effect between the superstructure and the room extension module is unsatisfactory time and again.

The object of the invention is therefore to further increase the impermeability of the connection between the superstructure and the room extension module.

The solution to this problem is achieved with the subject matter of claim 1, that is, a motorhome of the type described above, in which at least one force transmission means is arranged in the area of the seal on the superstructure and/or on the room extension module, which is configured in such a way that it narrowly limits a vertical relative movement between the superstructure and the room extension module by transmitting forces acting in the vertical direction between the room extension module and the superstructure. The approach according to the invention is therefore to use the room extension module to stabilize the adjacent superstructure and vice versa to improve the fit of the seal. A narrow limitation of the relative movement is to be understood as a movement which is just so large that the activation of the seal leads to a tight fit between the two adjacent components. In the best case the relative movement is completely eliminated and in the not quite optimal but still acceptable case it can amount to a few millimeters.

It is particularly advantageous if, in the area of the seal, at least one force transmission means is arranged on the superstructure and/or on the room extension module, which is configured in such a way that, when the room extension module is inserted into the superstructure, a self-acting locking of the superstructure with the room extension module occurs, in particular in the area of the seal. A self-acting locking is to be understood here as a locking that does not take place through an additional work or process step. In other words, the locking mechanism adjusts itself quasi automatically only through the movement of the room extension module when it is inserted into the superstructure.

Preferably, the force transmission means is configured in such a way that the locking of the superstructure and the room extension module is automatically released when the room extension module is pushed out. This can be achieved, for example, by means of positive locking. By moving the room extension module relative to the superstructure, this positive locking force transmission can be easily released.

Preferably, the force transmission means is configured in such a way that, after the room extension module has been inserted into the superstructure, force is transmitted between the superstructure and the room extension module in such a way that any forces originating from the seal and/or lifting forces acting on the roof of the superstructure are introduced at least partially into the room extension module and/or the superstructure via the force transmission means. In other words, the force transmission means is to be configured in such a way that a relative movement between the room extension module and the superstructure is prevented as far as possible by connecting the two adjacent components to each other via the force transmission means. As already described above, this connection is to be able to be released independently but also locked self-actingly in the manner described above when the room extension module is moved into or out of the superstructure.

The locking of the superstructure and the room extension module is particularly advantageous when the slideouts extend over large parts of the corresponding side wall of the superstructure. This is because the wall and roof panels commonly used for the construction of a motorhome superstructure or slideout are relatively flexible. These are usually GRP sandwich panels with a rigid foam core, which generally have wall thicknesses of only 30 to 60 mm. With large dimensions of the cut-outs necessary for the slideout, an activatable seal can push the roof plate of the room extension module away from the roof plate of the superstructure. In this respect, an effective sealing by the seal is no longer ensured with conventional construction, even with large expansion of an activated seal. In the worst case, the seal itself leads to leakage between the two components, as the two components practically evade the pressure of the seal. By locking the slideout with the superstructure in the area of the seal, this can no longer happen with the solution according to the invention, since the adjacent component then contributes to the stabilization of the adjacent softer component.

Furthermore, the force transmission means is configured as a pin, wedge and/or bracket. Such a configuration supports the force transmission. In particular, the bracket shape has the advantage that it is relatively easy to form a positive locking, since brackets can easily be attached to projections, noses or the like and can also easily be released again by a simple sliding movement. Brackets are also easy to manufacture and they can also be arranged in a plurality, for example along the joint between the slideout and the superstructure.

Furthermore, the force transmission means is pivotably arranged on a cantilever arm. This has the particular advantage that the force transmission means can be pivoted by a rotary movement on the cantilever arm when it enters the superstructure when the room extension module is inserted. Due to the geometric correlations associated with this, the length of the force transmission means effective in the vertical direction is shortened and the two parts contract automatically when the superstructure and room extension module are locked together. Conversely, it is sufficient to only push the slideout out of the superstructure so that the geometry causes an automatic release by pivoting the force transmission means.

Furthermore, at least one coupling means arranged opposite the force transmission means is arranged on the superstructure and/or on the room extension module. The term coupling means is to be understood here to describe a means which facilitates the connection of the force transmission means with the component opposite it (slideout or superstructure).

It is particularly useful if the coupling means is configured in particular as a hook directed towards the interior of the vehicle. A coupling means configured in this way has the advantage that it supports the locking process through its shape and ensures a corresponding positive locking with the force transmission means. Of course, it is conceivable that not only a single coupling means is arranged, but also a number of coupling means corresponding to the number of force transmission means.

Furthermore, the dimensions of the force transmission means, cantilever arm and coupling means are matched to one another in such a way that, when the room extension module is inserted into the superstructure, a force-locking and/or positive-locking connection of force transmission means and coupling means occurs with pivoting of the force transmission means. This is where the geometric interaction of the three components outlined above comes into effect. It is clear that the length of the cantilever arm and the force transmission means must also be directly related to the configuration of the coupling means and must be adapted to ensure that the superstructure and the room extension module are automatically locked and released without any problems.

Furthermore, the force transmission means and the cantilever arm are components of an edge protection assembly. The edge protection assembly can have a profile (e.g. of aluminium or plastic), which is arranged along the cutout of the superstructure or along the edge of the slideout. One or more force transmission means are then attached to this profile. This makes it easier to assemble the one or more force transmission means together with the respectively required cantilever arm (can be mounted or also be part of the profile). Thus, the assembly not only provides a neat ending for the edge and protects the edges of the respective component from damage, but also simplifies the mounting of the force transmission means.

Furthermore, the edge protection assembly preferably comprises an activatable seal and/or a wiper lip. This way not only the components required for the locking can be assembled in a single work step, but also the seal and any wiper lip that may be present can be assembled at the same time. All this further simplifies the assembly of the corresponding parts and also leads to the fact that an optically pleasing unit can be produced.

The force transmission means can also be configured as a rail with a carriage guided displaceably therein. This makes it possible to ensure force transmission between the room extension module and the superstructure even when the room extension module is fully extended or in any position between the retracted and extended states.

The rail can be attached to the roof of the superstructure and the carriage to an end of the room extension module facing the interior. This ensures that the room extension module is connected to the superstructure when fully extended. And this in such a way that relative movements can no longer occur that cannot be effectively sealed by the seal.

Alternatively, the rail is attached to the room extension module and the carriage is attached to an outer edge of the superstructure. This configuration leads to a prevention of relative movements, especially when the room extension module is inserted into the superstructure.

The motorhome according to the invention can also have at least two force transmission means arranged one above the other, wherein the first force transmission means has a first rail with a first carriage and the second force transmission means has a second rail with a second carriage. Thus, the room extension module and the superstructure can be very well braced together in the retracted as well as in the extended state.

Preferably, the first and/or second rail extend in a direction in which the room extension module is moved. The force transmission means then allows horizontal movements in particular and prevents vertical movements.

Furthermore, the second rail is attached to the room extension module by means of a spacer in such a way that the second rail extends over the roof of the superstructure.

Thus the room extension module clasps the edge of the roof, figuratively speaking. This results in a particularly good stabilisation of the roof edge in relation to the room extension module, which ultimately leads to a particularly good and secure fit of the seal.

It makes sense for the motorhome to have at least two force transmission means arranged side by side, which preferably each consist of a pair of two force transmission means arranged one above the other. In other words, the edge of the recess in the superstructure in which the room extension module is located is stabilized by means of at least two force transmission means. The edge is therefore divided into at least three laterally supported segments. This further increases the stabilization effect, especially if the force transmission means is a clasping configuration with two rails arranged one above the other.

It is useful here if at least one force transmission means is arranged at a distance from the corner of the recess in the superstructure in which the room extension module is arranged.

Figure 2:
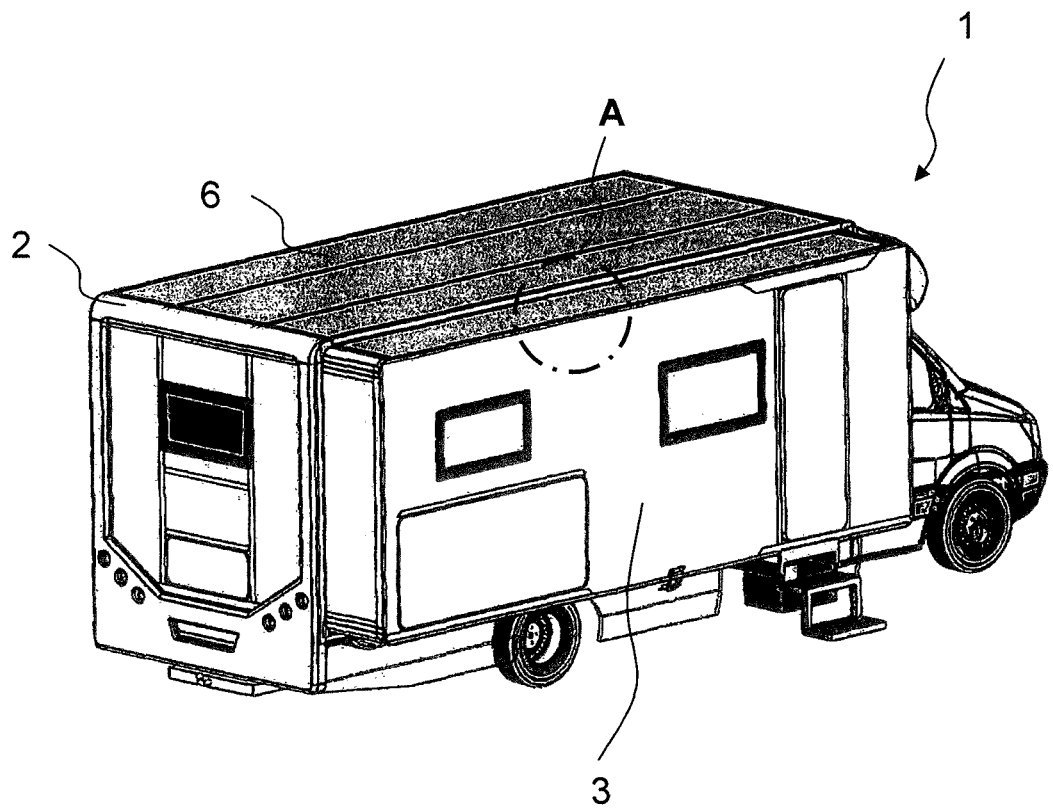
Figure 3:
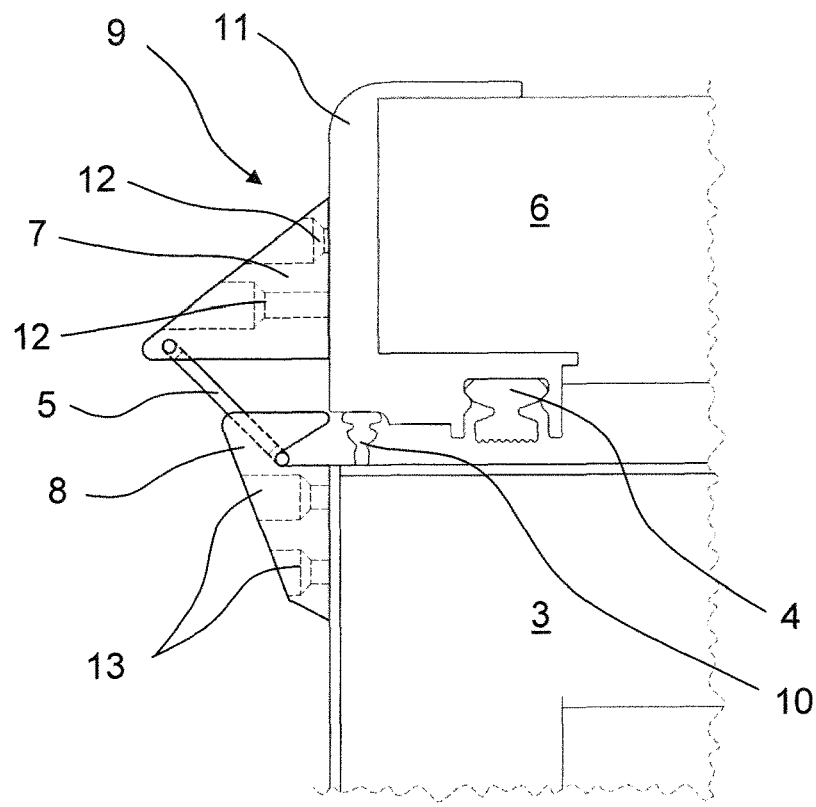
Figure 4:
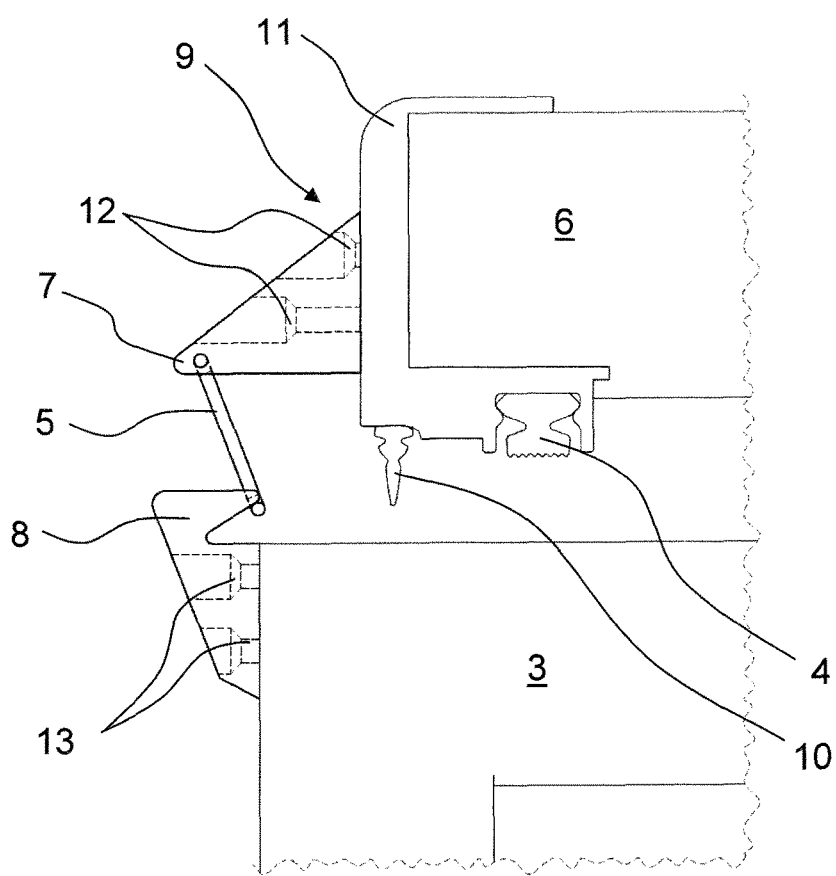
Figure 5:
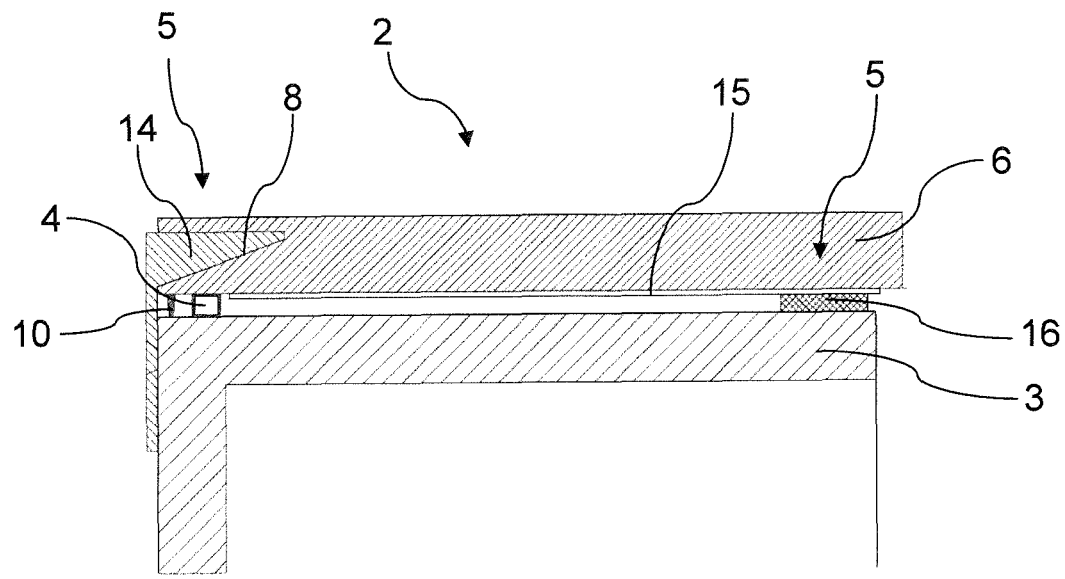

In the following, the invention will be explained in more detail using the embodiments shown in the drawings, wherein schematically show:

FIG. 1 a perspective view of an motorhome according to the invention;

FIG. 2 the same motorhome in the state in which a lateral room extension module has been pushed out of the superstructure;

FIG. 3 an enlarged sectional view of the area A shown in FIG. 1 and FIG. 2 in the retracted state;

FIG. 4 the area shown in FIG. 3 shortly before the end of the insertion or just after the beginning of the extension of the slideout;

FIG. 5 an alternative force transmission means; and

Figure 6:
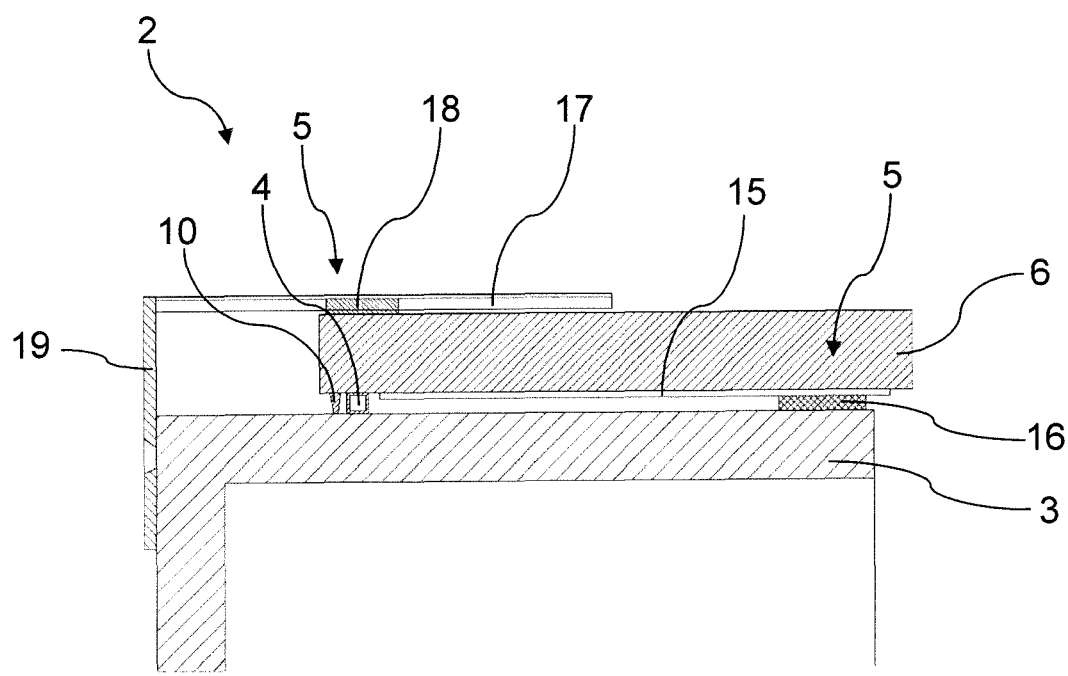

FIG. 6 another alternative embodiment of a force transmission means.

The motorhome shown in FIG. 1 and FIG. 2 is a motorhome according to the invention, wherein in FIGS. 1 and 2 the subject matter of the invention is not yet recognizable due to the scale. The subject matter of the invention then results from FIGS. 3 and 4, which show the area A indicated in FIGS. 1 and 2 in enlarged sectional view.

The motorhome 1 shown in FIGS. 1 and 2 thus has a superstructure 2, which in turn has a room extension module 3 displaceably attached to it. This room extension module 3 is so large that it extends over almost the entire length of the superstructure 2, so that the roof 6 of the superstructure 2 is no longer supported in this area. The room extension module 3 is also so high that it practically reaches up to the roof 6.

As can easily be seen in FIGS. 3 and 4, the motorhome 1 according to the invention therefore has an edge protection assembly 9 in area A, i.e. along the edge of the cutout provided for the slideout 3. This edge protection assembly 9 essentially consists of a metal profile 11, a seal 4 attached to it, a wiper lip 10 located on the outside of the superstructure 2 in front of the seal 4, and the cantilever arm 7 as well as the force transmission means 5 attached to it. The edge protection assembly 9 is placed on the front side of the plate forming the superstructure 2 or the roof 6 of the superstructure 2, respectively, and fastened to it by means of screws 12. The edge protection assembly 9 is configured in such a way that the cantilever arm 7, which is configured as a triangular metal piece, is fastened together with the metal profile 11 by means of the screws 12. Thus, the entire edge protection assembly 9 can be easily attached to assembly 2.

In FIG. 3, the force transmission means 5 is already in engagement with the coupling means 8 below it. This coupling means 8 is attached to the room extension module 3 by means of screws 13. In this case, force is transmitted via the force transmission means 5 from the superstructure 2 to the room extension module 3.

If the room extension module 3 is now moved to the left as shown in FIG. 4, for example to extend it as shown in FIG. 2, the room extension module 3 lowers slightly due to its own weight. Thus the distance between the roof of the superstructure 2 and the room extension module 3 becomes larger, as can be clearly seen in the comparison of FIGS. 3 and 4. Also by the fact that the force transmission means 5 is presently configured as a pivotable hook, the force transmission means 5 can follow this path and the room extension module 3 is completely released during further movement to the left or to the outside, so that in this area it is no longer connected to the superstructure 2 or the roof 6, respectively.

If the room extension module 3 is retracted, it is to be assumed that the gap between the roof 6 of the superstructure 2 and the room extension module 3 is slightly larger, as shown in FIG. 4, and that therefore the force transmission means 5 hanging downwards engages with the coupling means 8 configured as a hook. By pulling or pushing in the room extension module 3 into the superstructure 2, the hook-like configuration of the coupling means 8 results in a positive locking between the force transmission means 5 and the coupling means 8, so that the gap between the superstructure 2 or its roof 6, respectively, and the room expansion module 3 is locked and pulled in to the desired dimension, as seen in FIG. 3, already on the basis of the geometric correlations, when the room expansion module 3 is pulled into its flush end position. All this happens automatically, without the need for separate action.

The alternative embodiment shown in FIG. 5 consists mainly of the combination of two differently configured force transmission means 5. On the one hand, a first force transmission means 5 is configured as a wedge-shaped pin 14. This wedge-shaped pin 14 engages with a coupling means 8, which is configured as a recess arranged on the front side of the roof 6 and corresponds in its shape to the pin 14. Due to the wedge shape of the pin 14, a horizontal movement of the room extension module 3 into the superstructure 2 leads to a vertical bracing of the roof 6 with the room extension module 3. Thus no relative movements can occur between the two anymore and both components 6 and 3 contribute to the stabilization of the roof 6.

The second force transmission means 5 is configured as a rail 15 attached to the downward facing inner side of the roof 6, in which a carriage 16 attached to the room extension module is horizontally movably arranged. The carriage 16 attached to the inner edge of the room extension module 3 reliably prevents vertical relative movements between the room extension module 3 and the roof 6. Especially when seal 4 is activated in the extended state of the slideout 3, the proximity of the carriage 16 to the seal 4 ensures that the distance between the two components does not increase even under high contact pressure of the seal 4. This in turn leads to an improved and very weatherproof sealing effect of the activatable seal 4 arranged in front of the front side of the rail 15, even under adverse conditions.

A further alternative is the combination of two force transmission means 5 configured as rails. Thus a first rail 15 is arranged on the underside of the roof 6 of the superstructure 2, as already described in the embodiment above, the carriage 16 of which is attached to the upper inner edge of the room extension module 3.

On the outermost edge of the roof 6, instead of a recess as in the previous embodiment, a second carriage 18 for a second rail 17 is attached. This second rail is attached to the room extension module 3 by means of a spacer 19 in such a way that it extends over the roof 6 in the direction in which the slideout 3 is moved. This configuration of two force transmission means 5 above one another has the advantage that the second force transmission means 5 shown in FIG. 6 on the left improves the sealing in the retracted state, while the first force transmission means shown in the figure on the right especially develops its supporting effect on the fit of the activated seal 4 in the extended state of the slideout 3 (as already described above).

LIST OF REFERENCE NUMERALS 1. motorhome
2. superstructure 3. room extension module
4. seal
5. force transmission means
6. roof of the superstructure
7. cantilever arm
8. coupling means
9. edge protection assembly
10. wiper lip
11. edge protection profile
12. mounting screws for cantilever arm
13. mounting screws for coupling means
14. wedge-shaped pin
15. first rail
16. first carriage
17. second rail
18. second carriage
19. spacer

The invention claimed is:

1. A motorhome with a superstructure, wherein the superstructure has at least one room extension module displaceably attached to it and a seal arranged between the superstructure and the room extension module,
wherein at least one force transmission means is arranged in an area of the seal on the superstructure and/or on the room extension module, which is configured in such a way that it narrowly limits a vertical relative movement between the superstructure and the room extension module by transmitting forces acting in the vertical direction between the room extension module and the superstructure,
wherein the force transmission means is configured in such a way that any forces possibly introduced from the seal and/or forces acting from outside on a roof of the superstructure, forces lifting it or forces arching it upwards are introduced at least partially into the room extension module via the force transmission means.

2. The motorhome according to claim 1,
wherein the force transmission means is configured in such a way that, when the room extension module is inserted into the superstructure, a self-acting locking of the superstructure with the room extension module occurs.

3. The motorhome according to claim 2,
wherein the force transmission means is configured in such a way that the locking of the superstructure and the room extension module is automatically released when the room extension module is pushed out.

4. The motorhome according to claim 1,
wherein the force transmission means is configured as a pin, wedge and/or bracket.

5. The motorhome according to claim 1,
wherein the force transmission means is pivotably arranged on a cantilever arm.

6. The motorhome according to claim 1,
wherein at least one coupling means arranged opposite the force transmission means is arranged on the superstructure and/or on the room extension module.

7. The motorhome according to claim 6,
wherein the coupling means is configured as a hook, pin and/or wedge-shaped recess directed towards the interior of the superstructure.

8. The motorhome according to claim 6,
wherein the dimensions of the force transmission means and the coupling means are matched to one another in such a way that, when the room extension module is inserted into the superstructure, a force-locking and/or positive-locking connection of force transmission means and coupling means occurs.

9. The motorhome according to claim 1,
wherein the seal is an activatable seal.

10. The motorhome according to claim 5,
wherein at least one coupling means arranged opposite the force transmission means is arranged on the superstructure and/or on the room extension module,
wherein the force transmission means, the coupling means and/or the cantilever arm are part of an edge protection assembly.

11. The motorhome according to claim 10,
wherein the edge protection assembly comprises an activatable seal and/or a wiper lip.

12. The motorhome according to claim 1,
wherein the force transmission means is configured as a rail with a carriage guided displaceably therein.

13. The motorhome according to claim 12,
wherein the rail is attached to the roof of the superstructure and the carriage is attached to an end of the room extension module facing the interior of the superstructure.

14. The motorhome according to claim 12,
wherein the rail is attached to the room extension module and the carriage is attached to an outer edge of the superstructure.

15. The motorhome according to claim 1,
wherein it has at least two force transmission means arranged one above the other, wherein the first force transmission means has a first rail with a first carriage and the second force transmission means has a second rail with a second carriage.

16. The motorhome according to claim 15,
wherein the first rail and/or the second rail extend in a direction in which the room extension module is moved.

17. The motorhome according to claim 15,
wherein the rail is mounted to the room extension module by means of a spacer in such a way that the rail extends over the roof of the superstructure.

18. The motorhome according to claim 12,
wherein it has at least two force transmission means arranged side by side in the direction of a longitudinal axis of the motorhome.

19. The motorhome according to claim 1,
wherein at least one force transmission means is arranged at a distance from the corner of a recess in the superstructure, in which the room extension module is arranged.

* * * * *

UNITED STATES PATENT AND TRADEMARK OFFICE
CERTIFICATE OF CORRECTION

PATENT NO. : 11,673,503 B2  
APPLICATION NO. : 17/250200  
DATED : June 13, 2023  
INVENTOR(S) : Franz Wieth Page 1 of 1

It is certified that error appears in the above-identified patent and that said Letters Patent is hereby corrected as shown below:

On the Title Page

Item (73), Assignee: "PROTEO GMBH & CO. KG." should be --PROTEC GMBH & CO. KG.--

Signed and Sealed this  
Twenty-sixth Day of September, 2023

Katherine Kelly Vidal  
*Director of the United States Patent and Trademark Office*